United States Patent [19]

Chamayou dit Felix

[11] Patent Number: 4,750,807

[45] Date of Patent: Jun. 14, 1988

[54] CURVED SCREEN, PARTICULARLY MOTION-PICTURE PROJECTION SCREEN

[76] Inventor: Gérard Chamayou dit Felix, 93 rue Broca, 75013 Paris, France

[21] Appl. No.: 932,123

[22] Filed: Nov. 18, 1986

[30] Foreign Application Priority Data

Nov. 19, 1985 [FR] France .................. 85 17054

[51] Int. Cl.$^4$ ............................................. G03B 21/56
[52] U.S. Cl. ......................................... 350/125; 52/81
[58] Field of Search .......................... 52/81, 475, 536; 350/117, 125

[56] References Cited

U.S. PATENT DOCUMENTS

| 2,978,074 | 4/1961 | Schmidt | 52/81 |
| 3,848,897 | 10/1967 | Hourdiaux | 350/125 |
| 4,057,323 | 11/1977 | Ward, Jr. | 350/125 |
| 4,078,351 | 3/1978 | Simpson | 52/536 |

FOREIGN PATENT DOCUMENTS

| 2232114 | 1/1974 | Fed. Rep. of Germany . |
| 1590144 | 8/1968 | France . |
| 2219286 | 2/1974 | France . |
| 2540536 | 2/1983 | France . |

*Primary Examiner*—Richard A. Wintercorn
*Attorney, Agent, or Firm*—Charles W. Fallow; Martin P. Hoffman; Mitchell B. Wasson

[57] ABSTRACT

The invention relates to a curved screen, particularly a motion-picture projection screen.

It comprises a bearing geodesic structure, a reticulated secondary frame fastened to the hubs of the bearing structure, and arched polygonal elements mounted on the secondary frame, the adjacent polygonal elements having their edges overlapping.

3 Claims, 3 Drawing Sheets

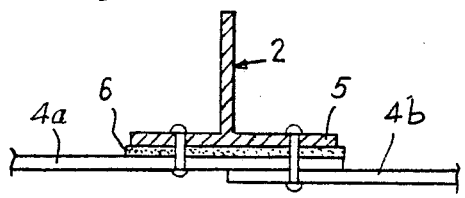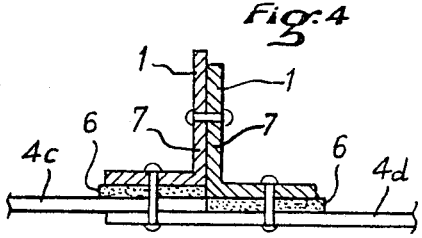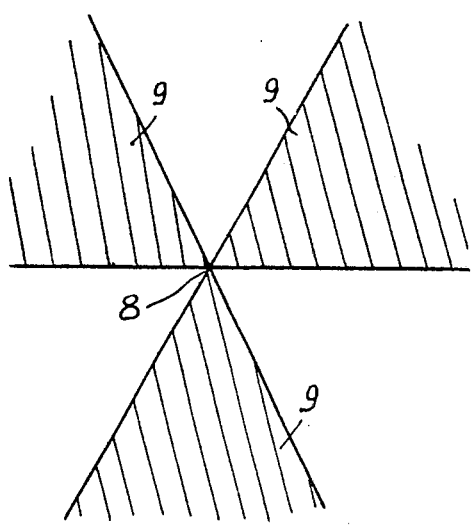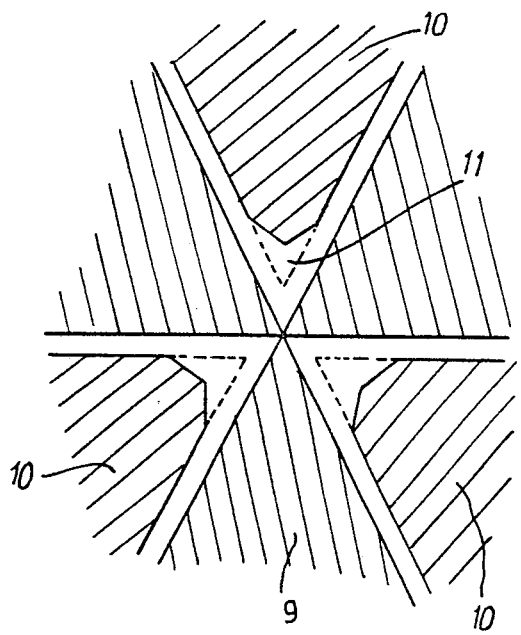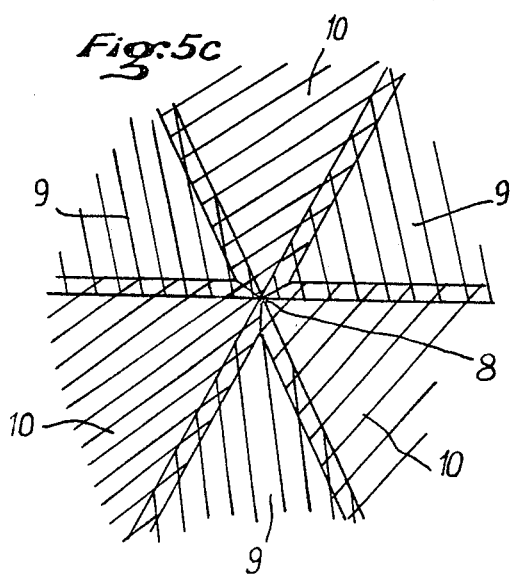

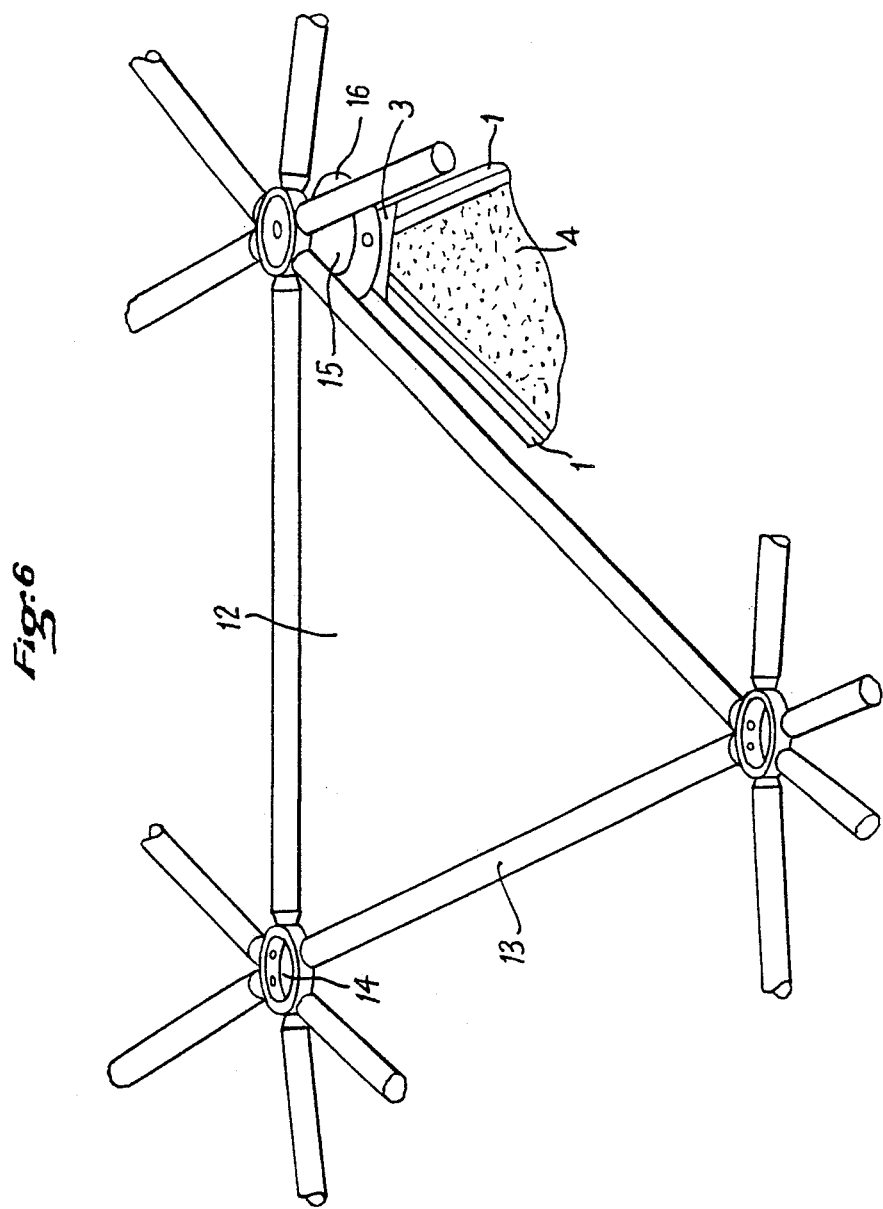

CURVED SCREEN, PARTICULARLY MOTION-PICTURE PROJECTION SCREEN

BACKGROUND

This invention relates to a curved screen, particularly a motion-picture projection or planetarium screen.

Curved, and more particularly spherical, motion-picture projection screens are already known.

There are also known from the document FR-A-2 540 536 domes, called geodesic, in which the covering elements are assembled edge to edge on a reticulate bearing structure.

It is also possible to consider using the technique of these geodesic domes for making curved screens, but this proves to be relatively unsuitable to the extent that there is always a space, even very small, between the edges of two covering elements, and this space appears as a dark line when the screen is illuminated.

SUMMARY OF THE INVENTION

This invention aims at providing a curved screen whose joints between elements are invisible when the screen is illuminated.

For this purpose, the invention has as its object a curved screen, particularly a motion-picture projection screen, characterized by the fact that it comprises a bearing geodesic structure, a reticulated secondary frame fastened to the hubs of the bearing structure, and arched polygonal elements mounted on the secondary frame, the adjacent polygonal elements having their edges overlapping.

Contrary to what occurs in the case of an edge to edge connection of the elements, the overlapping connection is practically invisible when the screen is illuminated. Moreover, the bearing geodesic structure assures a very great precision in assembling, on the order of some tenths of a millimeter between two hubs.

In a particular embodiment of the invention, the polygonal elements can be triangular elements, for example, grouped by fours to form prefabricated panels themselves triangular.

To assure the overlapping, in this latter case, some panels can have, on at least one of their edges, their triangular elements which go beyond the secondary frame.

This secondary frame can be formed by curved L- or T-sections on which the polygonal elements are riveted.

To avoid excess thicknesses that are too great, it is possible to provide, at the junction points between six triangular elements, three elements having their vertices in contact, interposed with three overlapping elements whose vertices are cut off to obtain at most a double thickness of said elements.

The polygonal elements of the screen can be made of perforated sheet metal, in which case a strip of a dark material is advantageously inserted between said elements and the secondary frame.

Thus the support structure is kept from appearing in the form of bright strips when the screen is illuminated.

Advantageously the arched elements are formed by stamping.

BRIEF DESCRIPTION OF THE DRAWINGS

There will not be described by way of non-limiting example a particular embodiment of the invention with reference to the accompanying diagrammatic drawings in which:

FIG. 3 is a section along line III—III of FIG. 1;

FIG. 4 is a section along line IV—IV of FIG. 2;

FIGS. 5a–5c diagramatically illustrate the junction between six screen elements; and FIG. 6 illustrates the assembly of a panel on the bearing geodesic structure.

DESCRIPTION OF THE PREFERRED EMBODIMENT

Figure 1:
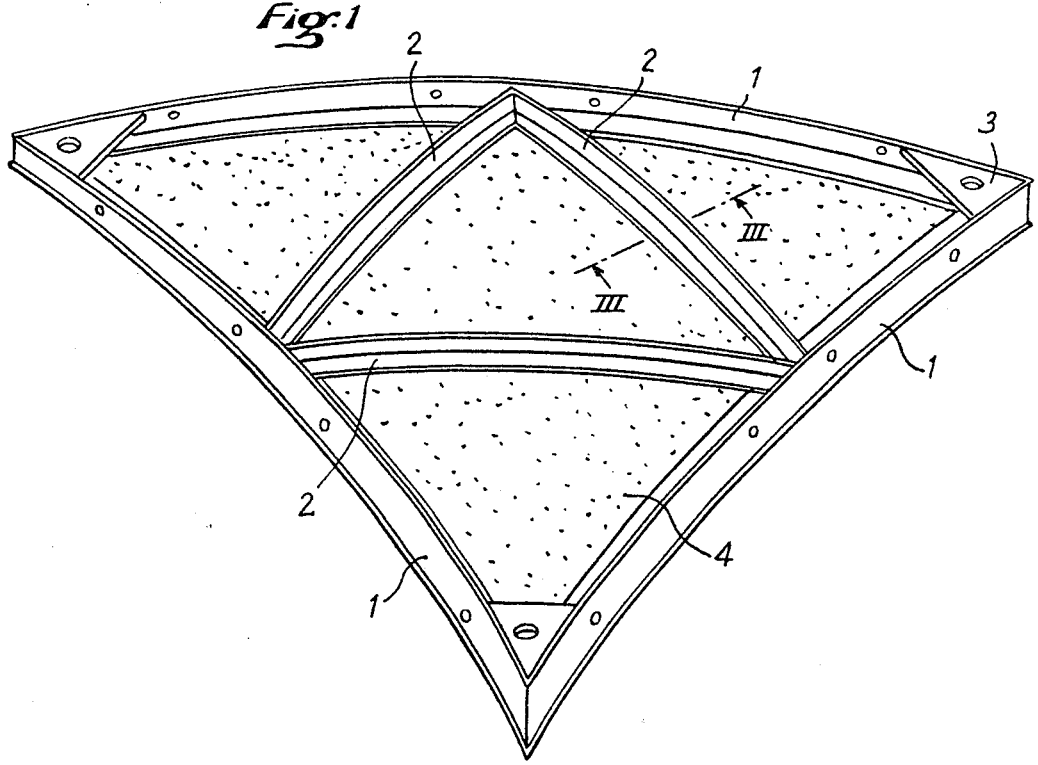
FIG. 1 represents a curved screen panel made according to the present invention.
Figure 2:
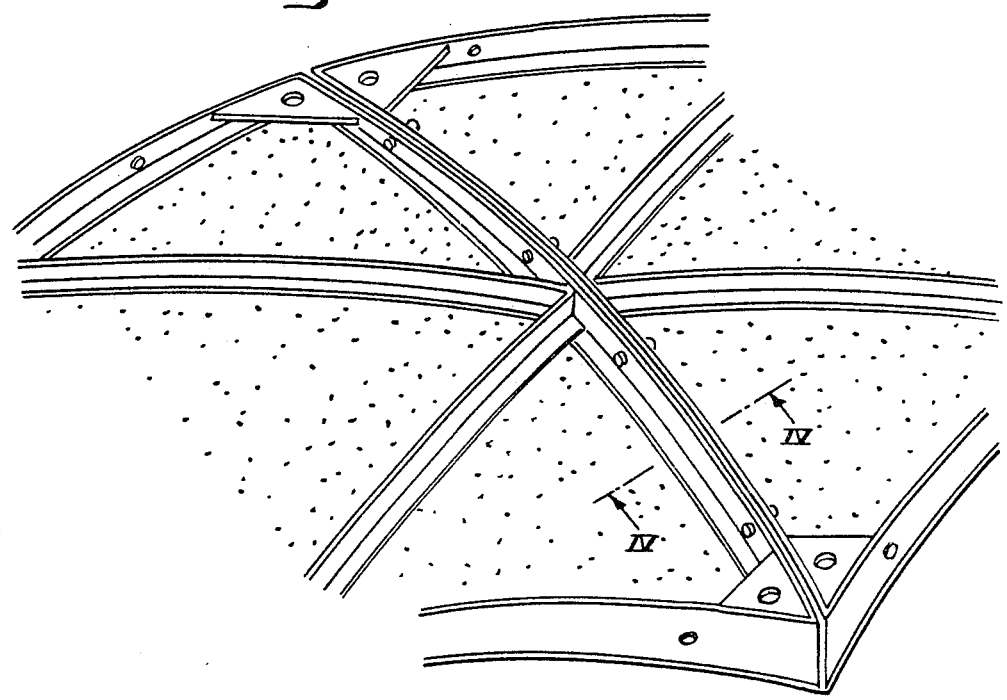
FIG. 2 represents a connection between two panels.

FIG. 1 represents a prefabricated panel generally exhibiting the shape of an equilateral spherical triangle delimited by three L-sections 1. Three other T-sections 2 delimit, with sections 1, four equilateral triangles. Sections 1 and 2 are curved at the radius of curvature of the screen.

Sections 1 and 2 form the secondary frame of the screen.

At the three corners of equilateral spherical triangle 1 are provided means 3 for fastening to a bearing structure which will be described in reference to FIG. 6.

The screen itself is made by assembling triangular elements 4 of perforated sheet metal, as will be described below, on the support structure consisting of sections 1 and 2.

At the level of sections 2, as shown in FIG. 3, one of elements 4a is riveted to the entire width of base 5 of the T so that the other element 4b, riveted to half of the width of base 5, overlaps element 4a.

It is further noted that a strip of dark material 6, for example, a strip of plastic, is inserted between element 4a and base 5 of the T so that this base does not show through the perforations of elements 4a and 4b.

FIG. 4 shows that some prefabricated elements have, on their edges, an element 4c which comes in plumb with wing 7 of section 1 while the other panels have on their edges an element 4d which goes beyond this wing 7. In both cases, a strip of dark material 6 is inserted between elements 4 and the base of the section.

Sections 1 of two adjacent panels are riveted by their wings, while providing a slight offset so that element 4d which goes beyond its respective section overlaps element 4c which comes in plumb with its section 1.

Thus, both at the level of an individual panel (FIG. 3) and at the level of the connection between two panels (FIG. 4), the overlapping of elements 4 is assured.

FIGS. 5a to 5c represent the junction between six elements or six panels at their vertex 8.

Three elements 9 are first put in place (FIG. 5a) with their vertex in contact at 8.

Elements 10 are then inserted between the panels (FIG. 5b), elements 10 having their vertex 11 truncated.

Elements 10 are then assembled (FIG. 5c) so that their edges overlap the edges of elements 9. However, because elements 10 have their vertices truncated at 11, it can be seen in FIG. 5c that these vertices are juxtaposed beside one another, so that at no place in the vicinity of point 8 is there a thickness greater than double the thickness of an element.

FIG. 6 represents a bearing structure constituting a part of a spherical dome formed by twenty identical spherical equilateral triangles each divided into a hundred base triangles 12.

The base triangles are formed by tubes 13 assembled by sixes at hubs 14.

Each hub 14 receives a pin 15 supporting a plate 16 to which are screwed said fastening means 3.

Elements 4 are therefore connected, by the secondary frame consisting of sections 1 and 2, to the bearing structure, which makes it possible to achieve the desired precision for the relative position of elements 4 among themselves.

Different variants and modifications can, of course, be brought to the above description without going outside the scope or spirit of the invention.

I claim:

1. A curved screen, particularly for motion-picture projection, comprising
    a bearing geodesic structure having plural hubs,
    a reticulated secondary frame fastened to the hubs of the bearing structure,
    arched triangular elements mounted on the secondary frame,
    adjacent of said triangular elements having their edges overlapping,
    said triangular elements being grouped by fours to form prefabricated panels which themselves are triangular,
    wherein some of said elements extend along at least one of their edges, beyond said secondary frame so as to achieve said overlapping.

2. A curved screen, particularly for motion-picture projection, comprising
    a bearing geodesic structure having plural hubs,
    a reticulated secondary frame fastened to the hubs of the bearing structure,
    arched triangular elements mounted on the secondary frame,
    adjacent of said triangular elements having their edges overlapping,
    wherein, at each junction point between six triangular elements, three elements, whose vertices are in contact, adjoin three overlapping elements whose vertices are truncated to obtain at most a double thickness of said elements.

3. A curved screen, particularly for motion-picture projection, comprising
    a bearing geodesic structure having plural hubs,
    a reticulated secondary frame fastened to the hubs of the bearing structure,
    arched polygonal elements mounted on the secondary frame,
    adjacent of said polygonal elements having their edges overlapping,
    wherein said elements are made of perforated sheet metal, and further comprising a strip of dark material inserted between said elements and the secondary frame.

* * * * *